United States Patent
Briese et al.

(10) Patent No.: US 10,408,656 B2
(45) Date of Patent: Sep. 10, 2019

(54) SENSOR FOR DETERMINING AT LEAST ONE PARAMETER OF A FLUID MEDIUM FLOWING THROUGH A MEASURING CHANNEL

(71) Applicant: Robert Bosch GmbH, Stuttgart (DE)

(72) Inventors: Achim Briese, Palo Alto, CA (US);
Alexander Markov, Stuttgart (DE);
Edda Sommer, Stuttgart (DE); Hans Beyrich, Freiberg (DE); Lutz Westenberger, Remseck (DE);
Reinhold Herrmann, Stuttgart (DE);
Thomas Schwartzkopff, Ditzingen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 15/603,602

(22) Filed: May 24, 2017

(65) Prior Publication Data
US 2017/0343406 A1 Nov. 30, 2017

(30) Foreign Application Priority Data
May 25, 2016 (DE) .......................... 10 2016 209 150

(51) Int. Cl.
*G01F 15/14* (2006.01)
*F02M 35/10* (2006.01)
*G01F 1/684* (2006.01)

(52) U.S. Cl.
CPC ....... *G01F 15/14* (2013.01); *F02M 35/10373* (2013.01); *G01F 1/684* (2013.01)

(58) Field of Classification Search
CPC . G01F 15/14; G01F 1/684; G01F 1/00; G01F 1/6842; G01F 5/00; F02M 35/10373; F02D 2041/285; F02D 41/18
See application file for complete search history.

(56) References Cited

U.S. PATENT DOCUMENTS 5,631,416 A * 5/1997 Rilling .................... G01F 1/684
73/114.34
9,658,092 B2 * 5/2017 Frauenholz ........... G01F 1/6842
(Continued)

FOREIGN PATENT DOCUMENTS

DE 102010020264 A1 12/2011

OTHER PUBLICATIONS

Konrad Reif (eds.): Sensors in the motor vehicle, 1st edition 2010, pp. 146-148.

*Primary Examiner* — Freddie Kirkland, III
(74) *Attorney, Agent, or Firm* — Norton Rose Fulbright US LLP; Gerard Messina

(57) ABSTRACT

A sensor for determining at least one parameter of a fluid medium flowing through a measuring channel, in particular an intake air mass flow of an internal combustion engine. The sensor includes a sensor housing, in particular a plug-in sensor which is inserted or is insertable into a flow tube, in which a channel structure is formed, which includes the measuring channel, and at least one sensor chip situated in the measuring channel for determining the parameter of the fluid medium. The sensor housing includes an inlet into the channel structure, which is oriented away from a main flow direction of the fluid medium, and at least one outlet from the channel structure. The channel structure is delimited by wall sections. The wall sections have at least partially electrically insulating properties. Areas of the sensor housing adjoining the wall sections have electrically conductive properties.

10 Claims, 3 Drawing Sheets

(56) References Cited

U.S. PATENT DOCUMENTS

2013/0061684 A1* 3/2013 Frauenholz ........... G01F 1/6842
  73/861
2017/0328753 A1* 11/2017 Briese ................... G01F 1/6842

* cited by examiner

SENSOR FOR DETERMINING AT LEAST ONE PARAMETER OF A FLUID MEDIUM FLOWING THROUGH A MEASURING CHANNEL

CROSS REFERENCE

The present application claims the benefit under 35 U.S.C. § 119 of German Patent Application No. DE 102016209150.6 filed on May 25, 2016, which is expressly incorporated herein by reference in its entirety.

BACKGROUND INFORMATION

Numerous methods and devices for determining at least one flow property of fluid media, i.e., liquids and/or gases, are available. The flow properties as possible parameters may be any physical and/or chemical measurable properties which qualify or quantify a flow of the fluid medium. In particular, this may be a flow speed and/or a mass flow and/or a volume flow.

The present invention is described in the following in particular with reference to so-called hot-film air-mass meters, as described, for example, from Konrad Reif (eds.): Sensors in the motor vehicle, 1st edition 2010, pages 146-148. Such hot-film air-mass meters are generally based on a sensor chip, in particular a silicon sensor chip, for example, including a sensor diaphragm as measuring surface or sensor area, over which the flowing fluid medium may flow. The sensor chip generally includes at least one heating element and at least two temperature sensors, which are situated, for example, on the measuring surface of the sensor chip, one temperature sensor being mounted upstream from the heating element and the other temperature sensor being mounted downstream from the heating element. From an asymmetry of the temperature profile detected by the temperature sensors, which is influenced by the flow of the fluid medium, a mass flow and/or a volume flow of the fluid medium may be inferred.

Hot-film air mass-meters are usually designed as plug-in sensors, which may be fixedly or exchangeably inserted into a flow tube. For example, this flow tube may be an intake tract of an internal combustion engine.

In this case, a partial flow of the medium flows through at least one main channel provided in the hot-film air-mass meter. A bypass channel is formed between the inlet and the outlet of the main channel. In particular, the bypass channel is designed in such a way that it has a curved section for deflecting the partial flow of the medium which has entered through the inlet of the main channel, whereby the curved section subsequently transitions into a section in which the sensor chip is situated. The last-mentioned section represents the actual measuring channel, in which the sensor chip is situated.

Such hot-film air-mass meters have to satisfy a large number of requirements in practice. In addition to the aim of reducing a pressure drop on the hot-film air-mass meter as a whole using suitable embodiments with respect to flow, one of the main challenges is to further improve the signal quality and the robustness of the devices against contamination by oil and water droplets as well as soot, dust and other solid particles. This signal quality relates, for example, to a mass flow of the medium through the measuring channel leading to the sensor chip, as well as, if necessary, to the reduction of a signal drift and the improvement of the signal-to-noise ratio. Here, the signal drift relates to the deviation, for example, of the mass flow of the medium in the sense of a change in the characteristic relationship between the actually occurring mass flow and the signal to be output in connection with the calibration during production. When the signal-to-noise ratio is ascertained, the sensor signals which are output in rapid time sequence are considered, while the characteristic or signal drift relates to a change in the mean value.

In conventional hot-film air-mass meters of the type described, a sensor carrier including a sensor chip attached to it or inserted into it generally protrudes into the measuring channel. For example, the sensor chip may be bonded into or bonded onto the sensor carrier. The sensor carrier may form a unit including, for example, a base plate made of metal, onto which an electronic system, an activation and evaluation circuit (for example, including a circuit substrate, in particular a circuit board) may be bonded. For example, the sensor carrier may be designed as an injection-molded plastic part of an electronic module. The sensor chip and the activation and evaluation circuit may, for example, be connected to one another by bonding connections. The electronic module created in this way may, for example, be bonded into a sensor housing and the entire plug-in sensor may be closed using covers.

German Patent Application No. DE 10 2010 020 264 A1 describes an air mass meter including a housing of plastic, which is electrically insulating, a flow channel being formed in the housing, and including a sensor element which is situated in the housing and which detects the air mass flowing in the flow channel. Situated in the housing are strip conductors which connect the sensor element to connecting pins. A part of the flow channel has electrostatically dissipative properties.

Despite the numerous advantages of the conventional methods for avoiding the contamination of the sensor element by, for example, dust particles, they still have potential for improvement. For example, the use of conductive plastics for flow-guiding components, which are connected to the ground line of the component, is a possible measure for avoiding contamination. This may reduce the static charge of the flow-guiding components, which increases the risk of contamination of the sensor element by dust particles. However, connecting the flow-guiding plastic components of the sensor housing to the carrier of the electronic components, such as a circuit board, requires an additional component made of conductive material, which results in increasing the cost of the sensor device. Furthermore, electrically charged particles are deposited in the flow-guiding part, which, although they are kept away from the sensor element, influence the flow prevailing in the measuring channel, which may in particular change the cross-section of the measuring channel.

SUMMARY

An example sensor system for determining at least one parameter of a fluid medium flowing through a channel is provided, which is at least able to largely avoid the disadvantages of conventional methods and strategies and in which a connection of flow-guiding plastic components to the carrier of electronic components, such as a circuit board, is made possible, in particular without a separate component. A connection to the ground line of the component may be established on the carrier of the electronic components.

A basic idea of the present invention is to modify the field lines in the area of the air mass sensor chip in such a way that the dust accumulations of electrostatically charged dust particles on the sensor element surface are avoided by keeping the dust particles out of the measuring channel.

The sensor system according to the present invention for determining at least one parameter of a fluid medium flowing through a measuring channel, in particular an intake air mass flow of an internal combustion engine, includes a sensor housing, in particular a plug-in sensor which is inserted or is insertable into a flow tube, in which a channel structure is formed which includes the measuring channel, and at least one sensor chip situated in the measuring channel for determining the parameter of the fluid medium. The sensor housing has an inlet into the channel structure which is oriented away from a main flow direction of the fluid medium and at least one outlet from the channel structure. The channel structure is delimited by wall sections. The wall sections have at least partially electrically insulating properties. Areas of the sensor housing adjoining the wall sections have electrically conductive properties. As a result, electrostatically charged particles are deposited in areas of the sensor housing outside of the channel structure.

The sensor housing may have a measuring channel cover in which the channel structure is formed. This simplifies the manufacture of the sensor and improves the manufacturing tolerances when assembling the components of the sensor.

The wall sections may be manufactured from an electrically insulating material. The areas of the sensor housing adjoining the wall sections may be manufactured from an electrically conductive material.

The wall sections and the areas of the sensor housing adjoining the wall sections may be connected to one another in a form-locked manner. The form-locked connection prevents detachment of the wall sections from the areas adjacent to the wall sections and a change in the geometry of the flow-guiding area of the sensor by climatic loads.

The electrically insulating material may be an electrically insulating plastic and the electrically conductive material may be an electrically conductive plastic. As a result, the wall sections and the areas of the sensor housing adjoining the wall sections may be formed as a two-component injection molded component. This makes cost-effective manufacture possible.

The wall sections and the areas of the sensor housing adjoining the wall sections may be manufactured from an electrically insulating material. The areas of the sensor housing adjoining the wall sections may have a coating which is manufactured from an electrically conductive material. The electrically insulating material may be an electrically insulating plastic. Consequently, the desired above-named effects are implemented using cost-effective materials.

Alternatively, the wall sections and the areas of the sensor housing adjoining the wall sections may be manufactured from an electrically conductive material. The wall sections may have a coating manufactured from an electrically insulating material.

Consequently, the desired above-named effects are implemented using cost-effective materials.

The areas of the sensor housing adjoining the wall sections may be electrically connected to a fixed potential, in particular the sensor mass. This makes it possible to easily remove the charge carriers from the dirt particles and thus achieve a simple neutralization of the dirt particles. These no longer accumulate on the sensor element. In a preferred specific embodiment, the fixed potential is the sensor mass. The sensor mass represents the neutral reference potential for the air mass meter and it is capable of accommodating large amounts of charge carriers without a potential shift.

In the context of the present invention, the main flow direction is to be understood as the local flow direction of the fluid medium at the location of the sensor or the sensor system, whereby, for example, local irregularities such as turbulences may remain unconsidered. In particular, the main flow direction may thus be understood to be the local averaged transport direction of the flowing fluid medium at the location of the sensor system. In this case, the averaged transport direction relates to a transport direction in which the fluid medium predominantly flows when averaged over time.

Electrically conductive plastics which are suitable for use in the present invention may be implemented using conductive constituents. Plastics including conductive constituents, such as, for example, polymers, fibers and/or conductive carbon black, may be integrated into it cost-effectively and easily. Suitable conductive fibers in the plastic are, for example, carbon or metal particles.

The conductive coating may be, for example, a dissipative coating. For example, the coating may be designed as a galvanic metal coating. It is also conceivable to produce the coating by metallic sputtering, metallization or by coating with a conductive lacquer.

In the context of the present invention, an injection-molded component is to be understood as a component which is manufactured by injection molding. Injection molding is a primary shaping method which is mainly used in plastic processing. The particular material is liquefied (plasticized) in an injection molding machine and injected into a mold, the injection mold, under pressure. In the mold, the material reverts to the solid state by cooling or a cross-linking reaction and is removed as a finished part after opening the mold. The hollow space, the cavity, of the mold determines the shape and the surface structure of the finished part.

The basic method of injection molding described above may be modified or extended for special applications. Multi-component injection molding makes it possible to manufacture parts from different plastics in one operation. Multi-component injection molding is used for manufacturing injection-molded components made up of two or multiple different plastics. This makes it possible to combine different materials and consequently different properties in a targeted manner.

In the context of the present invention, a form-locked connection is to be understood as a connection which is created by the interlocking of at least two connecting partners. As a result, the connecting partners may also not become detached without or with an interruption of a force transmission. In other words, in the case of a form-locked connection, one of the connecting partners stands in the way of the other. Under an operating load, compressive forces act normally, i.e., at right angles to the surfaces of the connecting partners.

BRIEF DESCRIPTION OF THE DRAWINGS

Additional optional details and features of the present invention ensue from the following description of preferred exemplary embodiments which are schematically shown in the figures.

DETAILED DESCRIPTION OF EXAMPLE EMBODIMENTS

Figure 1:
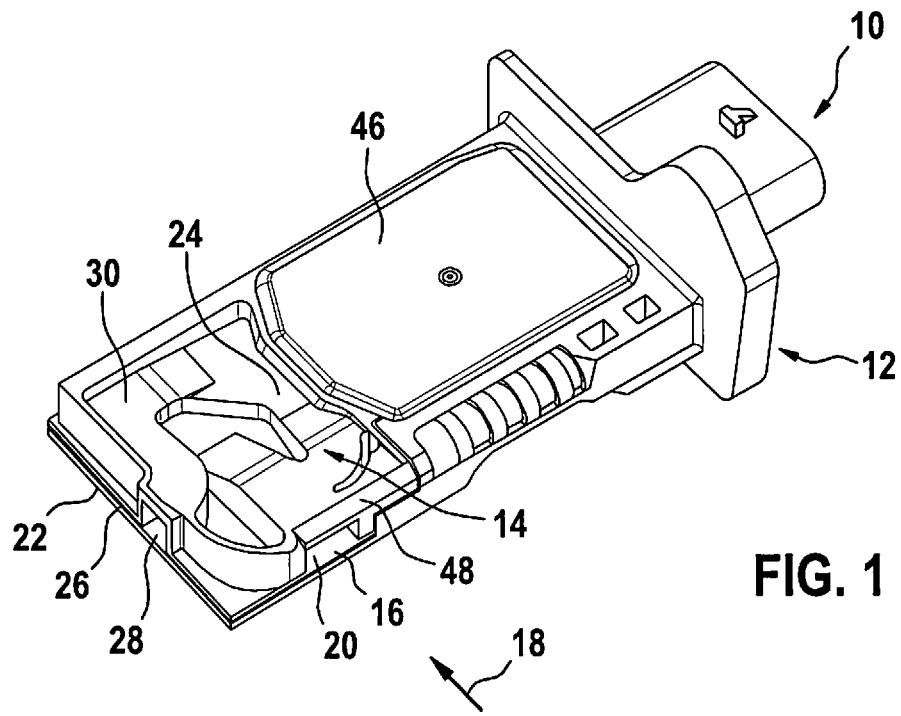
FIG. 1 shows a perspective representation of a sensor according to the present invention.

FIG. 1 shows a perspective representation of a sensor 10 according to the present invention for determining a parameter of a fluid medium flowing through a measuring channel. In this exemplary embodiment, sensor 10 is designed as a hot-film air-mass meter and may in particular detect an intake air mass flow of an internal combustion engine. In this exemplary embodiment, sensor 10 is designed as a plug-in sensor, which may, for example, be inserted into a flow tube, in particular an intake tract of the internal combustion engine. Sensor 10 includes a sensor housing 12.

A channel structure 14 is formed in sensor housing 12, through which a representative quantity of the fluid medium may flow via an inlet opening or inlet 16, which in the inserted state is oriented away from a main flow direction 18 of the fluid medium.

Channel structure 14 includes a main channel 20, which may open into a main channel outlet 21 (FIG. 2) on a bottom side 22 of sensor housing 12 in relation to the representation of FIG. 1, and a bypass or measuring channel 24 which branches off from main channel 20 into an outlet 28 of bypass or measuring channel 24 situated on surface 26, which in this exemplary embodiment may be the end face or end face relative to the representation of FIG. 1 of the plug-in sensor. However, it is explicitly emphasized that outlet 28 may also be situated on another surface of plug-in sensor 12, such as, for example, on bottom side 22 or on a top side 30.

Figure 2:
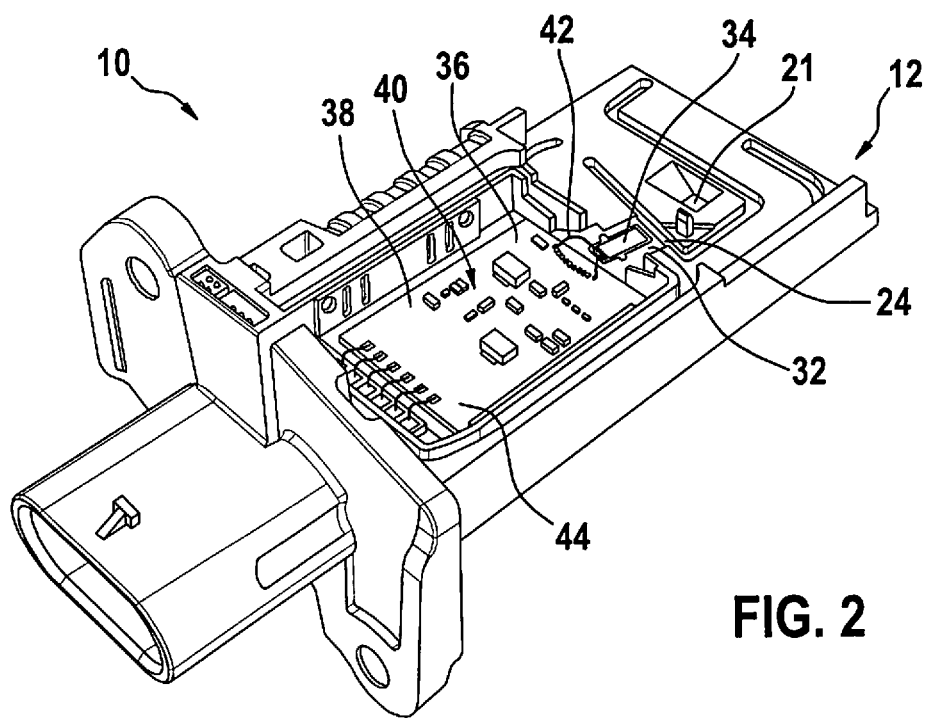
FIG. 2 shows a perspective view of sensor 10 in a non-closed state.

FIG. 2 shows a perspective view of sensor system 10 in a non-closed state. A sensor carrier 32 in the form of a wing protrudes into measuring channel 24 as is the case in conventional hot-film air-mass meters. A sensor chip 34 is inserted into this sensor carrier 32 in such a way that the fluid medium flows over a sensor diaphragm designed as a sensor area of sensor chip 34. Together with sensor chip 34, sensor carrier 32 is an integral part of an electronic module 36, which has a curved base plate as sensor carrier 32 as well as a circuit board 38, which is attached, for example, bonded to it, including an activation and evaluation circuit 40. Sensor carrier 32 may, for example, be injection-molded onto the base plate as a plastic component. Sensor carrier 32, which is injection-molded, for example, as an injection-molded component onto the base plate or may be integrally formed with the base plate of circuit board 38, is provided with a leading edge which may be rounded. Sensor chip 34 is electrically connected to activation and evaluation circuit 40 via electrical connections 42, which may be designed here as wire bonds. Electronic module 36 created in this way is introduced, for example, adhesively bonded, into an electronic space 44 of sensor housing 12. This may occur in such a way that sensor carrier 32 protrudes into channel structure 14. Subsequently, electronic space 44 is closed by an electronic space cover 46 (FIG. 1). Channel structure 14 is formed in a measuring channel cover 48.

Figure 3:
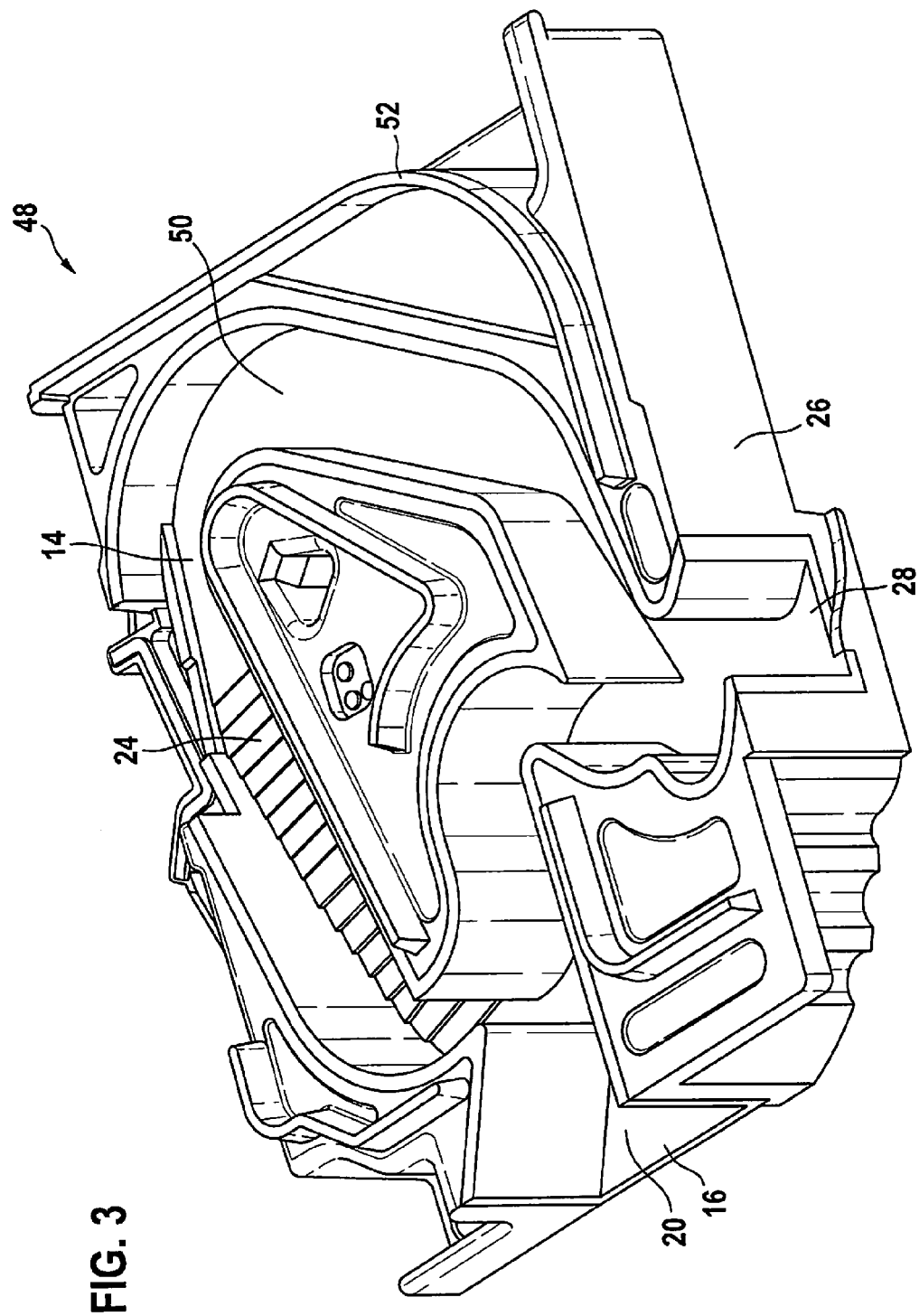
FIG. 3 shows a perspective representation of a measuring channel cover according to a first specific embodiment of the sensor.

FIG. 3 shows a perspective view of a measuring channel cover 48 according to a first specific embodiment of the present invention. Channel structure 14 is formed in measuring channel cover 48. FIG. 3 shows a possible variant in which main channel 20 and measuring channel 24 open jointly into outlet 28 on end face 26. As is apparent from FIG. 3, channel structure 14 is delimited by wall sections 50. Wall sections 50 thus provide the shape of channel structure 14. Areas 52 of sensor housing 12, and more specifically of measuring channel cover 48, adjoin wall sections 50. Wall sections 50 have at least partially electrically insulating properties. In contrast, areas 52 of sensor housing 12, which adjoin wall sections 50, and more specifically of measuring channel cover 48 have electrically conductive properties. For example, with the exception of wall sections 50, measuring channel cover 48 has electrically conductive properties, as will be described in greater detail below. Channel structure 14 is delimited at least on three sides by wall sections 50 within measuring channel cover 48. The fourth side of the delimitation may be implemented by bottom side 22 of sensor housing 12. Bottom side 22 may also have electrically conductive properties. Alternatively, bottom side 22 may also have electrically insulating properties in its sections facing channel structure 14.

In the first specific embodiment, wall sections 50 are manufactured from an electrically insulating material. The electrically insulating material is an electrically insulating plastic. Areas 52 of sensor housing 12 adjoining wall sections 50 are manufactured from an electrically conductive material. The electrically conductive material is an electrically conductive plastic. Wall sections 50 and areas 52 of sensor housing 12 adjoining wall sections 50 are formed as a two-component injection molded component. In other words, measuring channel cover 48 is designed as a two-component injection-molded component in which the wall sections manufactured from the electrically insulating material or plastic and the remaining areas and, in particular, areas 52 adjoining wall sections 50 are manufactured from the electrically conductive material or plastic.

Figure 4:
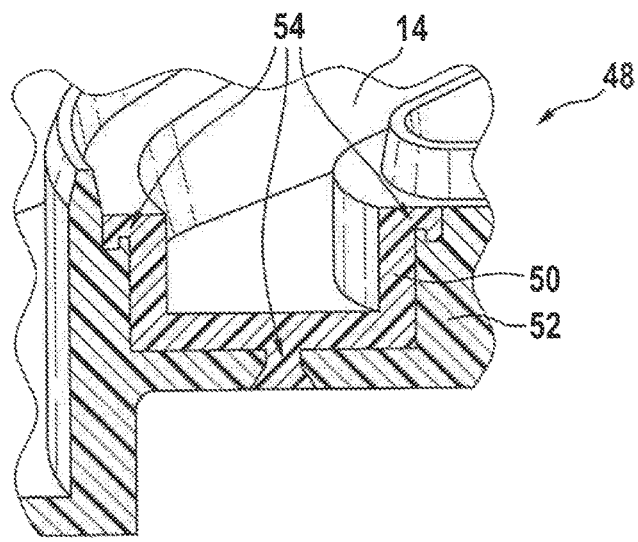
FIG. 4 shows a cross-sectional view of a part of the measuring channel cover.

FIG. 4 shows a cross-sectional view of a part of measuring channel cover 48. Optionally and preferably, wall sections 50 and areas 52 of sensor housing 12 or measuring channel cover 48 adjoining wall sections 50 are connected to one another in a form-locked manner. Three form-locked connection points 54 are shown as examples in FIG. 4, which are distributed over the cross section of channel structure 14. Accordingly, wall sections 50 on the side walls and on the top side of channel structure 14 are connected to adjoining areas 52 in a form-locked manner.

Figure 5:
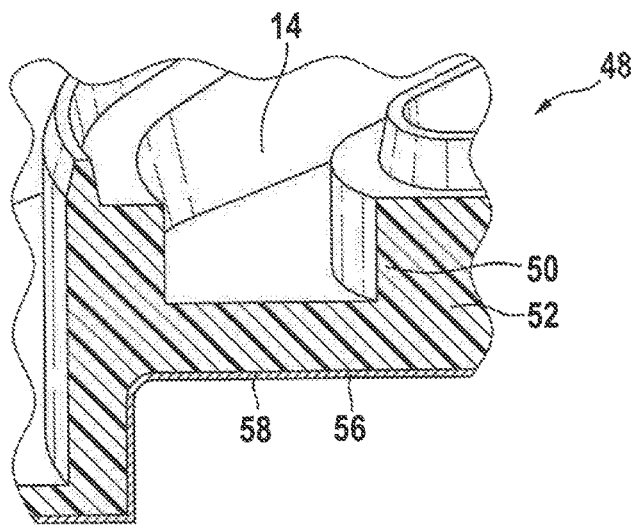
FIG. 5 shows a cross-sectional view of a measuring channel cover according to a second specific embodiment of the sensor.

FIG. 5 shows a cross-sectional view of a measuring channel cover 48 according to a second specific embodiment of the present invention. Only the differences from the first specific embodiment are described below, and identical components are provided with identical reference numerals. In the case of measuring channel cover 48 of the second specific embodiment, wall sections 50 and areas 52 of sensor housing 12 adjoining wall sections 50 are manufactured from an electrically insulating material such as, for example, an electrically insulating plastic. In order to implement the electrically conductive properties of areas 52 adjoining wall sections 50, areas 52 of sensor housing 12 adjoining wall sections 50 have a coating 56 which is manufactured from an electrically conductive material. Coating 56 is applied on an outer side 58 of measuring channel cover 48 and thus on a side of measuring channel cover 48 facing away from channel structure 14. The electrically conductive material of coating 56 is, for example, a metal which is applied to outer side 58 by sputtering. For example, measuring channel cover 48 is completely manufactured from an electrically insulating plastic and is provided with coating 56 on outer side 58.

Figure 6:
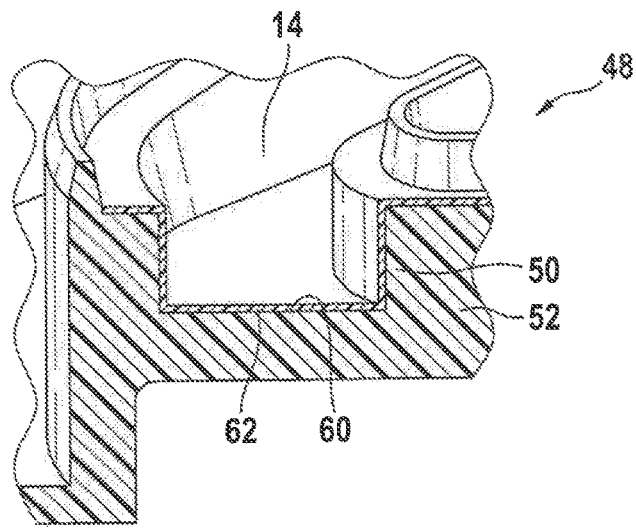
FIG. 6 shows a cross-sectional view of a measuring channel cover according to a third specific embodiment of the sensor.

FIG. 6 shows a cross-sectional view of a part of a measuring channel cover 48 according to a third specific embodiment of the present invention. Only the differences from the first specific embodiment are described below, and identical components are provided with identical reference numerals. In the case of measuring channel cover 48 of the second specific embodiment, wall sections 50 and areas 52 of sensor housing 12 adjoining wall sections 50 are manufactured from an electrically conductive material such as, for example, an electrically conductive plastic. In order to implement the electrically insulating properties of wall sections 50, wall sections 50 of sensor housing 12 have a coating 60 which is manufactured from an electrically insulating material. Coating 60 is applied to an inner side 62 of measuring channel cover 48, which faces channel structure 14. The electrically insulating material of coating 60 is, for example, an electrically insulating plastic, which is applied to inner side 62 by spraying. For example, measuring channel cover 48 is completely manufactured from an electrically conductive plastic and is provided with coating 60 on inner side 62 facing channel structure 14.

In all of the above-described specific embodiments, areas 52 of sensor housing 12 adjoining wall sections 50 are electrically connected to a fixed potential. The fixed potential is preferably the sensor mass.

What is claimed is:

1. A sensor for determining at least one parameter of a fluid medium flowing through a measuring channel, the fluid medium being an intake air mass flow of an internal combustion engine, the sensor comprising:
   a sensor housing, inserted or insertable into a flow tube, the sensor housing having a channel structure formed therein which includes the measuring channel, and at least one sensor chip being situated in the measuring channel for determining the parameter of the fluid medium, the sensor housing having an inlet into the channel structure, which is oriented away from a main flow direction of the fluid medium, and at least one outlet from the channel structure, the channel structure being delimited by wall sections, wherein the wall sections have electrically insulating properties, areas of the sensor housing adjoining the wall sections having electrically conductive properties, wherein the electrically insulating material is an electrically insulating plastic.

2. The sensor as recited in claim 1, wherein the sensor housing includes a measuring channel cover, wherein the channel structure is formed in the measuring channel cover.

3. The sensor as recited in claim 1, wherein the wall sections are manufactured from an electrically insulating material, wherein the areas of the sensor housing adjoining the wall sections are manufactured from an electrically conductive material.

4. The sensor as recited in claim 3, wherein the wall sections and the areas of the sensor housing adjoining the wall sections are connected to one another in a form-locked manner.

5. The sensor as recited in claim 3, wherein the electrically conductive material is an electrically conductive plastic.

6. The sensor as recited in claim 5, wherein the wall sections and the areas of the sensor housing adjoining the wall sections are formed as a two-component injection molded component.

7. The sensor as recited in claim 1, wherein the areas of the sensor housing adjoining the wall sections are electrically connected to a fixed potential sensor mass.

8. A sensor for determining at least one parameter of a fluid medium flowing through a measuring channel, the fluid medium being an intake air mass flow of an internal combustion engine, the sensor comprising:
   a sensor housing, inserted or insertable into a flow tube, the sensor housing having a channel structure formed therein which includes the measuring channel, and at least one sensor chip being situated in the measuring channel for determining the parameter of the fluid medium, the sensor housing having an inlet into the channel structure, which is oriented away from a main flow direction of the fluid medium, and at least one outlet from the channel structure, the channel structure being delimited by wall sections, wherein the wall sections have electrically insulating properties, areas of the sensor housing adjoining the wall sections having electrically conductive properties, wherein the wall sections and the areas of the sensor housing adjoining the wall sections are manufactured from an electrically insulating material, wherein the areas of the sensor housing adjoining the wall sections have a coating, wherein the coating is manufactured from an electrically conductive material.

9. The sensor as recited in claim 8, wherein the electrically insulating material is an electrically insulating plastic.

10. A sensor for determining at least one parameter of a fluid medium flowing through a measuring channel, the fluid medium being an intake air mass flow of an internal combustion engine, the sensor comprising:
   a sensor housing, inserted or insertable into a flow tube, the sensor housing having a channel structure formed therein which includes the measuring channel, and at least one sensor chip being situated in the measuring channel for determining the parameter of the fluid medium, the sensor housing having an inlet into the channel structure, which is oriented away from a main flow direction of the fluid medium, and at least one outlet from the channel structure, the channel structure being delimited by wall sections, wherein the wall sections have electrically insulating properties, areas of the sensor housing adjoining the wall sections having electrically conductive properties, wherein the wall sections and the areas of the sensor housing adjoining the wall sections are manufactured from an electrically conductive material, the wall sections having a coating, the coating being manufactured from an electrically insulating material.

* * * * *